United States Patent
Brown

(10) Patent No.: US 12,091,762 B2
(45) Date of Patent: Sep. 17, 2024

(54) SOLID OXIDE ELECTROLYSIS CELL SYSTEM AND A METHOD OF OPERATING A SOLID OXIDE ELECTROLYSIS CELL SYSTEM

(71) Applicant: VERSA POWER SYSTEMS, LTD, Danbury, CT (US)

(72) Inventor: Casy Cloudless Brown, Calgary (CA)

(73) Assignee: Versa Power Systems, Ltd, Danbury, CT (US)

( * ) Notice: Subject to any disclaimer, the term of this patent is extended or adjusted under 35 U.S.C. 154(b) by 309 days.

(21) Appl. No.: 17/391,621

(22) Filed: Aug. 2, 2021

(65) Prior Publication Data

US 2022/0042190 A1 Feb. 10, 2022

Related U.S. Application Data

(60) Provisional application No. 63/060,854, filed on Aug. 4, 2020.

(51) Int. Cl.
*C25B 15/02* (2021.01)
*C25B 1/02* (2006.01)
(Continued)

(52) U.S. Cl.
CPC ............ *C25B 15/02* (2013.01); *C25B 1/02* (2013.01); *C25B 9/19* (2021.01); *C25B 9/65* (2021.01); *C25B 9/70* (2021.01); *C25B 13/07* (2021.01)

(58) Field of Classification Search
CPC .......................... C25B 15/02–15/033; H01M 8/0432–8/04373;
(Continued)

(56) References Cited

U.S. PATENT DOCUMENTS

2009/0263681 A1* 10/2009 Atreya ............... H01M 8/0488
429/418
2019/0245224 A1* 8/2019 Lacroix .................. C25B 15/08
(Continued)

FOREIGN PATENT DOCUMENTS

EP 3 719 171 10/2020
JP 2020-041202 3/2020
(Continued)

OTHER PUBLICATIONS

Stambouli et al ("Solid oxide fuel cells (SOFCs): a review of an environmentally clean and efficient source of energy", Renewable and Sustainable Energy Reviews, 6, 2002, and pp. 433-455) (Year: 2002).*

(Continued)

*Primary Examiner* — Alexander W Keeling
(74) *Attorney, Agent, or Firm* — Foley & Lardner LLP

(57) ABSTRACT

A method of operating a solid oxide electrolysis cell (SOEC) system at partial load, where the SOEC system includes a plurality of branches electrically connected in parallel, and each branch includes at least one SOEC stack. The method includes determining a thermally neutral target voltage below which operation is endothermic and above which operation is exothermic; and executing pulse width modulation current control by cycling an ON phase and an OFF phase for each branch such that the SOEC system operates at an average operating power equal to a chosen percentage of the operating power at the thermally neutral target voltage. In the ON phase, all of the SOEC stacks in a branch operate at the thermally neutral target voltage, and in the OFF phase, all of the SOEC stacks in the branch operate at 0% power. Each branch is configured to be operated independently of the other branches.

20 Claims, 6 Drawing Sheets

(51) Int. Cl.
*C25B 9/19* (2021.01)
*C25B 9/65* (2021.01)
*C25B 9/70* (2021.01)
*C25B 13/07* (2021.01)

(58) Field of Classification Search
CPC ............... H01M 8/04701–8/04738; H01M 10/60–10/617; H01M 10/63–10/637; H01M 10/65–10/6595
See application file for complete search history.

(56) References Cited

U.S. PATENT DOCUMENTS

| | | | |
|---|---|---|---|
| 2020/0119373 A1* | 4/2020 | Hakala | H01M 8/04388 |
| 2022/0205121 A1* | 6/2022 | Jensen | C25B 15/025 |

FOREIGN PATENT DOCUMENTS

| | | | | |
|---|---|---|---|---|
| WO | WO-2018/033948 | | 2/2018 | |
| WO | WO-2018033948 A1 * | | 2/2018 | C25B 15/02 |
| WO | WO-2019173858 A1 * | | 9/2019 | H01M 8/04302 |

OTHER PUBLICATIONS

Das et al., "Adaptive Control of a Solid Oxide Fuel Cell Ultra-Capacitor Hybrid System," (2013) IEEE Transactions on Control Systems Technology, vol. 21, No. 2, pp. 372-383.

Dillig et al., "Thermal management of high temperature solid oxide electrolyser cell/fuel cell systems," (2012) Energy Procedia 28, pp. 37-47.

PCT International Search Report and Written Opinion dated Nov. 5, 2021 in International Application No. PCT/IB2021/057062.

Petipas et al., "Thermal Management of Solid Oxide Electrolysis Cell Systems Through Air Flow Regulation," (2017) Chemical Engineering Transactions, vol. 61, pp. 1069-1074.

Qiong et al., "The effects of operating conditions on the performance of a solid oxide steam electrolyser: a model-based study," (2010) Fuel Cells, Wiley-VCH Verlag, 2010 10 (6), pp. 1114. 10.1002/fuce.200900211 .hal-00591285.

Sanz-Bermejo et al., "Part load operation of a solid oxide electrolysis system for integration with renewable energy resources," (2015), International Journal of Hydrogen Energy, Elsevier Science Publishers B.V., Barking, GB, vol. 40, No. 26 pp. 8291-8303.

Wendel, C., "Design and Analysis of Reversible Solid Oxide Cell Systems for Electrical Energy Storage," (2015) IEEE Transactions on Control Systems Technology, a thesis submitted to the Faculty and the Board of Trustees of the Colorado School of Mines in partial fulfillment of the requirements for the degree of Doctor of Philosophy (Mechanical Engineering).

Wyatt, W., "Applications of Pulse Width Modulations to LEDS, Fuel Cells and Battery Technology," (2011) A Thesis Submitted to the Faculty of The College of Engineering and Computer Science in Partial Fulfillment of the Requirements for the Degree of Master Science, Florida Atlantic University, Boca Raton, Florida.

* cited by examiner

SOLID OXIDE ELECTROLYSIS CELL SYSTEM AND A METHOD OF OPERATING A SOLID OXIDE ELECTROLYSIS CELL SYSTEM

CROSS-REFERENCE TO RELATED APPLICATIONS

This application claims priority to and the benefit of U.S. Provisional Patent App. No. 63/060,854, filed Aug. 4, 2020, the entire disclosure of which is incorporated herein by reference.

BACKGROUND

The present disclosure relates to electrolysis cell systems for the production of fuels, primarily hydrogen, from electricity. In particular, the present disclosure relates to a solid oxide electrolysis cell system and a method of operating a solid oxide electrolysis cell system for part load and rapid response capability.

Electrolysis cells are devices that are capable of converting electrical input energy into chemical energy stored in a fuel, such as a hydrocarbon fuel, through electrochemical reactions. In general, an electrolysis cell comprises an anode, an electrolyte layer, and a cathode. The electrolyte layer serves to transfer ions between the anode and the cathode, which facilitate reactions within the anode and the cathode to produce chemical fuel.

Electrolysis cells are often characterized by the type of electrolyte layer used for the transfer of specific ions. For example, one type of electrolysis cell is the solid oxide electrolysis cell (SOEC), which incorporates a solid ceramic electrolyte for the transfer of negatively charged oxygen ions from the cathode to the anode.

At the cathode, oxygen containing reactants (often steam of $CO_2$) dissociate due to applied current to form hydrogen or CO along with oxygen ions that transport charge across the electrolyte to the anode:

$$H_2O + 2e^- \rightarrow H_2 + O^{2-} \quad (1)$$

$$CO_2 + 2e^- \rightarrow CO + O^{2-} \quad (2)$$

Oxygen ions combine at the anode to form gaseous oxygen according to the reaction:

$$O_2^- \rightarrow \tfrac{1}{2}O_2 + 2e \quad (1)$$

The solid ceramic electrolyte of the SOEC is a solid, nonporous metal oxide. For example, the solid ceramic electrolyte of the SOEC may include $Y_2O_3$-stabilized $ZrO_2$ (YSZ). The cathode of the SOEC may include, for example, a metal/YSZ cermet. In some examples, the cathode of the SOEC may include a porous two phase nickel and yttria stabilized zirconia (Ni/YSZ) cermet. The anode of the SOEC may be, for example, Sr-doped $LaMnO_3$.

The SOEC operating temperature is typically in the range of about 650° C. to about 1000° C., at which temperature ionic conduction by oxygen ions occurs. Referring to FIG. 1, a non-limiting example of the relationship between the SOEC operating current (horizontal axis) and electrochemical heat generation (vertical axis) is shown for example cases at each of 650° C., 700° C., and 750° C. It is desired to operate at a target operating point in which the SOEC is operating at a thermally neutral condition (i.e., the voltage below which the SOEC stack operation is endothermic and above which the SOEC stack operation is exothermic). The thermally neutral condition is temperature dependent. For example, when the SOEC operating temperature is 750° C., the target operating point is approximately 1.285 V/cell. Most electrolysis stack technologies operate solely in their respective exothermic regions by virtue of their reaction kinetics. High performance SOEC stacks offer the potential to operate either exothermically or endothermically depending on conditions.

In the example of FIG. 1, point d is the target operating point, but it is understood that the target operating point may vary between systems and applications. A shaded zone identifies an example preferred operating range. This preferred operating range reflects the need to supply or reject heat from the stack as it deviates from thermally neutral. The higher the heat load (exothermic or endothermic) the more complex and expensive the resulting thermal management strategy, and the more stress applied to the SOEC stack. Depending on design a SOEC stack may operate with heat loadings of 0.2 W/cm², however a preferred operating range would be less than 0.1 W/cm², and a more preferred operating range would be less than 0.05 W/cm², each reduction in operating range offering a simpler and more robust overall system. At point d, the stack is operating at 750° C., −1 A/cm², and is operating at a thermally neutral condition. When operating at point d, the SOEC system need only preheat the inlet gases, and can use the heat in the process exhausts to do so. If the operating power drops, for example to point b, the SOEC stack is operating outside the preferred operating range (shaded zone) and the SOEC stack operation is endothermic. The SOEC stack will either cool towards 700° C. before reaching thermally neutral conditions again (due to poorer overall performance at lower temperature) or the SOEC stack will have to engage auxiliary heaters to keep the stack at operating temperature. If the SOEC stack is allowed to cool, then the SOEC system must cope with a different operating temperature.

If the operating power increases again, for example, to point a, the increase quickly drives the SOEC stack operation into a heavily exothermic condition. While this will tend to drive the stack back up to the target operating temperature, this is a relatively slow process. Given typical SOEC stacks, a time span of minutes is required to transition upwards by 50° C. Meanwhile, local overheating and increased exhaust temperature can start to negatively impact the SOEC stack and system operation, negatively affecting the useful lifetime thereof. The curves are not symmetric. The overheating for a given increase in operating power is much larger than the cooling associated with the same magnitude of decrease in operating power. In addition, the thermal conditions impact cell voltage, and changes from endothermic operating conditions to exothermic operating conditions may result in large changes in stack voltage which could exceed 30%. Thus, the associated power electronics must be able to handle a wider range of voltages, which tends to both increase cost and decrease efficiency of the power electronics.

If the SOEC load was dropped all the way to 50% load and the SOEC stack cooled to 650° C. (point c), then it would be difficult to increase the operating power beyond ~60% without waiting for the stack and process to heat up again, which is a relatively slow process. In typical SOEC stacks, a 100° C. increase in temperature may take several tens of minutes.

The system turndown ratio is defined as the ratio of the system peak power to its lowest sustainable operating point. Operational turndown for solid oxide electrolysis cell systems has typically been accommodated by changing the process conditions rather than the stack conditions, in particular, by changing reactant flows or concentrations and/or by shifting the operating temperature. In order to operate in or to traverse the endothermic operating range present in high performance SOEC systems, conventional solutions include traversing the endothermic region quickly so as to avoid overcooling. This inherently disallows sustained part load operation. Another conventional solution includes adding supplemental heat to the process. Some heating is necessary for initial heat to operating temperature, so those heaters may also serve to maintain temperature during endothermic operation if suitably designed. Yet another conventional solution includes allowing the stacks to cool, reducing their efficiency to the point where they stop being endothermic and establish a new equilibrium at a lower operating temperature.

A need exists for a method of operating a solid oxide electrolysis cell system with high turndown, without driving significant balance of plant requirements in terms of extra heaters, ability to operate across a wide temperature range, etc. In particular, a need exists for a method of operating a solid oxide electrolysis cell system for part load and rapid response capability.

SUMMARY

In certain embodiments, a solid oxide electrolysis cell system includes a plurality of branches electrically connected in parallel, each branch including at least one solid oxide electrolysis cell stack, each solid oxide electrolysis cell stack including a plurality of solid oxide electrolysis cells. A method of operating the solid oxide electrolysis cell system at partial load includes determining, for a given operating temperature, a thermally neutral target voltage below which operation of the solid oxide electrolysis cell system is endothermic and above which operation of the solid oxide electrolysis cell system is exothermic; and executing pulse width modulation current control by cycling an ON phase and an OFF phase for each of the branches such that, for an operational cycle of the solid oxide electrolysis cell system, the solid oxide electrolysis cell system operates at an average operating power equal to a chosen percentage of the operating power at the thermally neutral target voltage for an operational cycle of the solid oxide electrolysis cell system. In the ON phase, all of the solid oxide electrolysis cell stacks in a given branch operate at the thermally neutral target voltage. In the OFF phase, all of the solid oxide electrolysis cell stacks in the given branch are unloaded to an open circuit voltage and operate at 0% of rated power. Each of the branches is configured to be operated in the ON phase or in the OFF phase independent of the other branches.

In some aspects of the method or system, in at least one period of time in the operational cycle, all of the branches are in the OFF phase.

In some aspects of the method or system, in at least one period of time in the operational cycle, all of the branches are in the ON phase.

In some aspects of the method or system, in at least one period of time in the operational cycle, at least one branch is in the ON phase while at least one branch is in the OFF phase. This minimizes the ripple in total output power at any point in time. The larger the number of stacks connected electrically in parallel and individually switched, the lower the imposed ripple due to ON phase and OFF phase transitions.

In some aspects of the method or system, switching between the ON phase and the OFF phase occurs between successive periods of time in the operational cycle, as opposed to during a period of time.

In some aspects of the method or system, in the operational cycle: a first branch is in the ON phase for a duration of a first period of time, while a second branch is in the OFF phase for the duration of the first period of time; the second branch is switched to the ON phase at a beginning of a second period of time and remains in the ON phase for a duration of the second period of time; and the first branch remains in the ON phase for the duration of the second period of time, or is switched to the OFF phase at the beginning of the second period of time and remains in the OFF phase for the duration of the second period of time.

In some aspects of the method or system, executing pulse width modulation current control comprises selecting a pulse width modulated frequency and a duty cycle such that a dominant thermal condition is thermally such that transition periods between ON and OFF phases or OFF and ON phases account for less than 10 percent of the duration of the operational cycle.

In some aspects of the method or system, the pulse width modulated frequency and the duty cycle are selected such that each branch switches from the ON phase to the OFF phase before cell starvation due to reactant depletion occurs.

In some aspects of the method or system, the pulse width modulated frequency and the duty cycle are selected such that the dominant thermal condition is thermally neutral or selected by a controller programmed to target slightly net endothermic or slightly net exothermic conditions such that temperatures of the solid oxide electrolysis cell stacks are constant or are ramped in a controlled manner between target operating temperatures reflecting system demand.

In some aspects of the method or system, the pulse width modulated time constant is selected to lie between $\tau_e$ (the electrical time constant associated with the voltage response to current changes and typically on the order of milliseconds) and $\tau_e$ (the chemical time constant associated with reactant supply and reactant depletion at the electrochemical locations within the SOEC stack and typically on the order of seconds).

In some aspects of the method or system, the dominant thermal condition avoids heavily endothermic and heavily exothermic regions of an overall stack operational window. In some aspects of the method or system, the operating current density of each branch may be within 50 mW/cm² of the current density at the thermally neutral target voltage during the ON phase.

In some aspects of the method or system the pulse width modulated time constant is selected such that the heat generation during a full pulse width modulated cycle is dominated by the ON-time conditions and the OFF-time conditions, and not by the conditions during the transition between ON and OFF or the transition between OFF and ON.

In some aspects of the method or system the ON phases are selected to lie at or near a thermally neutral condition. Near thermally neutral conditions may be selected if and when the system controls desire to shift the operating temperature towards a new operating point (for example, in preparation for a sustained idle period where cooling may be desired or on recovery from a sustained idle period where heating may be desired).

In some aspects of the method or system, the ON phases are selected to lie at or near a thermally neutral condition. Near thermally neutral conditions may be selected if and when the OFF time conditions are not fully thermally neutral due to excess heat loss or heat generation from the balance of process, in which case the ON phases will be selected to provide the endotherm or exotherm necessary to balance the overall thermal conditions to control SOEC stack temperatures.

In some aspects of the method or system, the pulse width modulated time constant is selected such that the product and reactant concentrations near the electrochemically active areas are dominated by the average conditions during a full pulse width modulated cycle, and not by the conditions during the ON-time and the OFF-time of the operational cycle.

In some aspects of the method or system, the pulse width modulated time constant is selected such that the thermal conditions and resulting temperatures during a full pulse width modulated cycle are dominated by the average conditions, and not by the conditions during the ON-time and the OFF-time of the operational cycle.

In some aspects of the method or system, the pulse width modulation frequency and duty cycle are selected to define a pulse width modulated time constant $\tau_{pwm}$ that simultaneously allows part power operation of the overall system while operating at a substantially thermal neutral condition (or small but controlled deviation from thermally neutral), while maintaining near constant utilization and substantially constant temperature due to the diffing magnitudes of the respective process time constants.

In some aspects of the method or system, the resulting operational strategy allows the SOEC stacks to operate at a thermal condition (temperature) that retains the ability to ramp to full power in a time on the order of $\tau_e$ (for example on the order of milliseconds), rather than being restricted by $\tau_t$ (the thermal time constant associated with the thermal mass of the SOEC stack and the temperature response to heat flow, typically on the order of minutes) as would be a conventionally controlled SOEC system.

In some aspects of the method or system, the resulting operational strategy allows the SOEC stacks to operate at a thermal condition that retains the ability to ramp to full power and maintain sustained operation at full power in a time on the order of $\tau_{flow}$ (for example on the order of seconds), rather than being restricted by $\tau_t$ (the thermal time constant associated with the thermal mass of the SOEC stack and the temperature response to heat flow, typically on the order of minutes) as would be a conventionally controlled SOEC system.

In some aspects of the method or system, the resulting operational strategy allows the SOEC stacks to operate at part load conditions while maintaining full operating temperature and without requiring substantial external heating, in a manner than allows power turndown on the order of 10:1 while maintaining operation in a thermally neutral manner.

In some aspects of the method or system, the resulting operational strategy two or more electrically parallel branches of stacks are switched according to the pulse width modulated sequence in a manner such that at least one branch is in the ON phase while at least one other branch is in the OFF phase. For example a 50% power demand would have only half the stacks in the ON phase at any particular point in time, while all stacks would experience a duty cycle of 50% over the pulse width modulated repeat period.

In some aspects of the method or system, the resulting operational strategy two or more electrically parallel branches are switched according to the pulse width modulated sequence in a manner such that weaker branches may be loaded less than stronger branches to the overall benefit of system life and efficiency.

In some aspects of the method or system, the total power cycle is a first predetermined percentage of rated power; each of the branches operate at 100% for a predetermined percentage of time; and the first predetermined percentage of rated power is equal to the predetermined percentage of time during which each of the branches operate at 00%.

In some aspects of the method or system, a maximum instantaneous power step is a second predetermined percentage of rated power, the second predetermined percentage of rated power being calculated by dividing 100% by a number of the branches in the solid oxide electrolysis cell system.

In some aspects of the method or system, at least one of the branches operates at 100% of rated power in a first ON phase, and operates at 0% of rated power in a next ON phase that immediately follows the first ON phase.

In some aspects of the method or system, at least one of the branches is unloaded and operated at 0% of rated power at regular intervals in an operational cycle of the solid oxide electrolysis cell system.

In some aspects of the method or system, at least one of the branches is unloaded at irregular intervals in an operational cycle of the solid oxide electrolysis cell system.

In some aspects of the method or system, for two sequential cycles in the operational cycle of the solid oxide electrolysis cell system, the branches in the first subset are the same.

In some aspects of the method or system, for two sequential cycles in the operational cycle of the solid oxide electrolysis cell system, the branches in the first subset are the different.

In some aspects of the method or system, each of the plurality of solid oxide electrolysis cells comprises an anode, a cathode, and a solid ceramic electrolyte.

In some aspects of the method or system, the solid ceramic electrolyte comprises nonporous metal oxide.

One of ordinary skill in the art would appreciate that the aspects described above are not mutually exclusive and may be combined.

These and other advantageous features will become apparent to those reviewing the disclosure and drawings.

DETAILED DESCRIPTION

Referring generally to the figures, disclosed herein is a method of operating a SOEC system for part load and rapid response capability. As discussed above, the SOEC system includes at least one solid oxide electrolysis cell. Preferably, a plurality of solid oxide electrolysis cells may be stacked and interleaved with interconnect plates, which distribute gases to the electrode/electrolyte interfaces and act as current collectors, to form a solid oxide electrolysis cell stack. The SOEC system may include a plurality of SOEC stacks forming at least some electrically parallel branches, for example, 40 SOEC stacks may be connected in 20 electrically parallel branches. According to the operational method, each SOEC branch can be loaded independent of the other SOEC branch from open circuit to full load, while operating at a thermally neutral or near thermally neutral condition. Each SOEC branch includes one or more SOEC stacks. The operational method also provides the ability to operate the SOEC system at part load, but under thermal conditions that allow for rapid (approximately instantaneous) transition to full load.

A typical part load cycle of an SOEC stack is described as follows:

Phase 1—The SOEC stack is operating at zero current, thermally neutral, at the nominal operating temperature. Reactant flow through the stack is set according to the nominal power demand.

Phase 2—The SOEC stack switches to the full current at the thermally neutral condition. The SOEC stack voltage response is near instantaneous, and the time spent at part load (endothermic) conditions is, for example, a few milliseconds. The heat absorbed during this transition time is negligible compared to the thermal mass of the SOEC stack. Negligible temperature change occurs.

Phase 3—The SOEC stack is now at the full current at the thermally neutral condition, and the flows may be too low to support this current indefinitely. However, there is a volume of gas present adjacent to the active areas of the solid oxide electrolysis cells sufficient to support some operational time. Depending on design this could be, for example, on the order of $1/10^{th}$ of a second.

Phase 4—The SOEC stack switches back to open circuit before cell starvation due to reactant depletion occurs.

Phase 5—The stack now sits at open circuit voltage (OCV) for a period proportional to the desired load target and proportional to the time the SOEC stack was at full load. For example, a target of 40% of full load operating point, with an on-time of $1/10^{th}$ of a second, will have an off-time of $1.5/10^{ths}$ of a second. During this time, the gas flow continues without interruption, sweeping products away from the active area of the SOEC/SOEC stack and providing new reactants for the next cycle. The SOEC stack is at a thermally neutral condition. The cycle then repeats from Phase 1.

Figure 1:
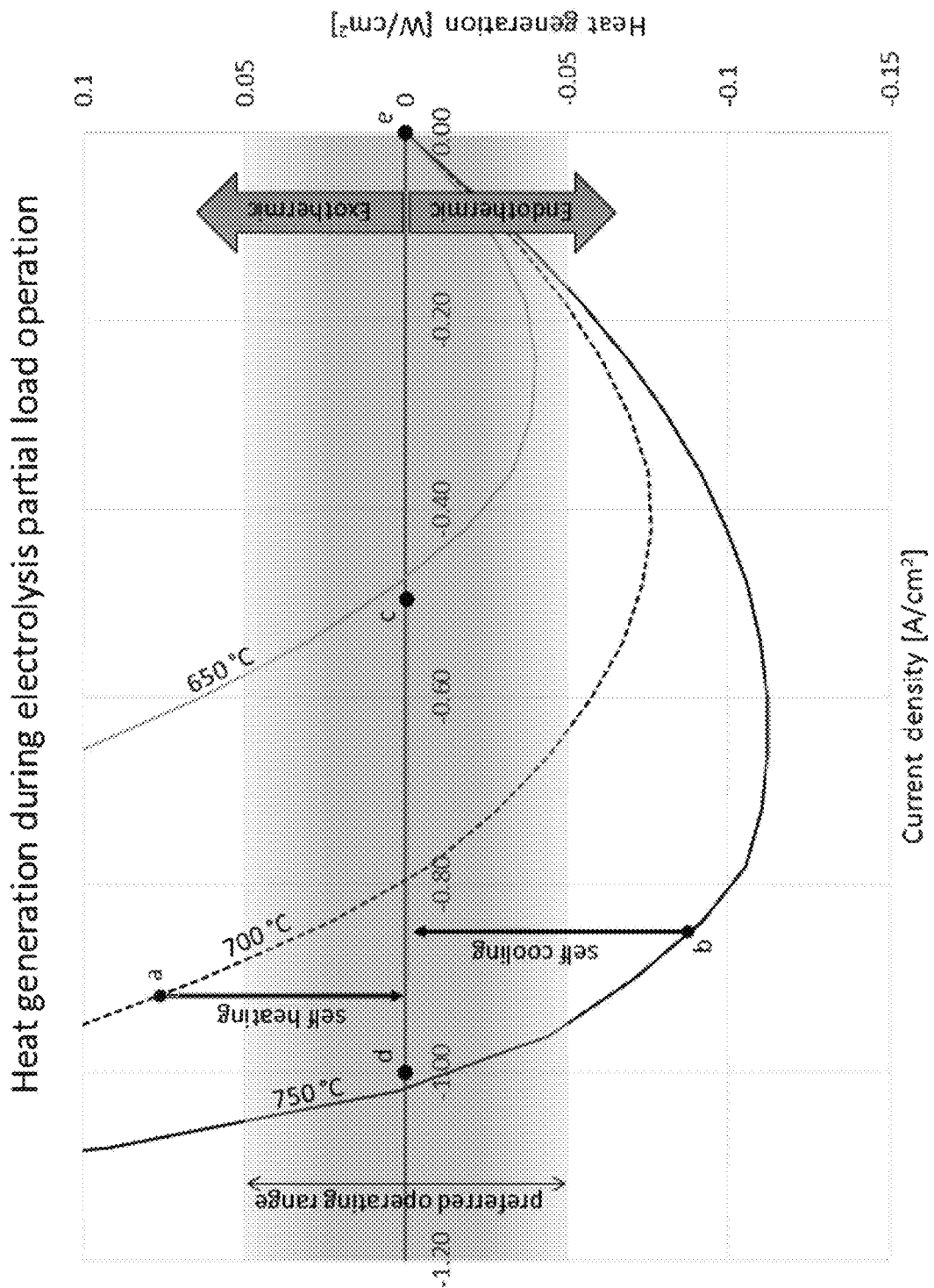
FIG. 1 shows a relationship between operating current (horizontal axis) and electrochemical heat generation (vertical axis) is shown for example cases at each of 650° C., 700° C., and 750° C.

Referring to FIG. 1, a non-limiting example of the relationship between the SOEC operating current (horizontal axis) and electrochemical heat generation (vertical axis) is shown for example cases at each of 650° C., 700° C., and 750° C. In the example of FIG. 1, point d is the target operating point, but it is understood that the target operating point may vary between systems and applications. At point d, the stack is operating at 750° C., −1 A/cm², and is operating at a thermally neutral condition. When operating at point d, the SOEC system need only preheat the inlet gases, and can use the heat in the process exhausts to do so. If the operating power drops, for example to point b, the SOEC stack is operating outside the preferred operating range (shaded zone) and the SOEC stack operation is endothermic. For example the target operating point may be within 50 mW/cm² of thermally neutral, or more, or less, depending on the stack and system design. A stack operating outside the preferred operating range may be described as heavily exothermic or heavily endothermic. A stack operating within the preferred operating point, but not at the thermally neutral target voltage may be described as slightly exothermic or slightly endothermic. On power unload from point d the SOEC stack will either cool towards 700° C. before reaching thermally neutral conditions again (due to poorer overall performance at lower temperature) or the SOEC stack will have to engage auxiliary heaters to keep the stack at operating temperature. If the SOEC stack is allowed to cool, then the SOEC system must cope with a different operating temperature.

If the operating power increases again, for example, to point a, the increase quickly drives the SOEC stack operation into a heavily exothermic condition. While this will tend to drive the stack back up to the target operating temperature, this is a relatively slow process associated with the thermal time constant of the SOEC stack. Before thermal equilibrium is re-established, local overheating and increased exhaust temperature can start to negatively impact the SOEC stack and system operation, negatively affecting the useful lifetime thereof. The curves are not symmetric. The overheating for a given increase in operating power is much larger than the cooling associated with the same magnitude of decrease in operating power. In addition, the thermal conditions impact cell voltage, and changes from endothermic operating conditions to exothermic operating conditions may result in large changes in stack which could exceed 30%. Thus, the associated power electronics must be able to handle a wider range of voltages, which tends to both increase cost and decrease efficiency of the power electronics.

If the SOEC load was dropped all the way to 50% load and the SOEC stack cooled to 650° C. (point c), then it would be difficult to increase the operating power beyond ~60% without waiting for the stack and process to heat up again, which is a relatively slow process dictated by the thermal time constant Tt.

A method of operating the SOEC system at partial load (hereinafter "operational method") will now be described. The SOEC system includes a plurality of solid oxide electrolysis cell stacks connected in parallel. Each SOEC stack includes a plurality of solid oxide electrolysis cells. The operational method includes determining, for a given operating temperature a thermally neutral target voltage below which operation of the SOEC system is endothermic and above which operation of the SOEC is exothermic, and executing pulse width modulation current control by cycling an ON phase and an OFF phase for each SOEC stack, such that, for an operational cycle of the SOEC system, the SOEC system operates at an average operating power equal to a chosen percentage of the operating power at the thermally neutral target voltage. As used herein, an "operational cycle" refers to a period of time in which an electrolysis cell stack is operating in accordance with the embodiments of the invention, as opposed to operating at a steady voltage or being powered off for an extended period of time. An electrolysis cell stack is considered to be operating at "100% power" or "full power" when operating at the thermally neutral target voltage at a given operating temperature. This may also be referred to as the "rated power" at a given operating temperature. During an ON phase, an electrolysis cell stack operates at the thermally neutral target voltage. During an OFF phase, an electrolysis cell stack is unloaded and operates at 0% power. The solid oxide electrolysis cell stacks may be divided into multiple electrically parallel branches. For any electrical branch, in the ON phase, the solid oxide electrolysis cell stacks in the branch operate at 100% power. In the OFF phase, the solid oxide electrolysis cell stacks in the branch are unloaded to an open circuit voltage. Each of the solid oxide electrolysis cell stack electrical branches is configured to be operated at 100% power or unloaded independent of the other solid electrolysis cell stack electrical branches. The SOEC system may include a controller programmed to carry out the steps of the operational method.

According to the operational method, the pulse widths and loading of the SOEC stack are controlled such that the SOEC system operates at or near a thermally neutral condition during an on-pulse (Mode 1). In the off-pulse (Mode 2), the stack is unloaded, which is intrinsically a thermally neutral condition. By switching between Mode 1 and Mode 2, the stack can be held at near thermally neutral conditions, while operating at part loads which would otherwise be heavily endothermic. The operational method takes advantage of the different time constants associated with 1) the voltage response (cell voltage to current), which is on the order of ms response times, 2) the electrochemistry reaction response (flow to current) as a function of utilization, which is on the order of sub-second response times, and 3) the thermal response (temperature to current), which is on the order of multiple second response times. These time constants are physical characteristics of the materials and design of the SOEC stack and system.

Within the SOEC stack and system at least three characteristic time constants can be identified:

$\tau_e$: The electrical time constant associated with the voltage response to current changes and typically on the order of milliseconds;

$\tau_c$: The chemical time constant associated with reactant supply and reactant depletion at the electrochemical locations within the SOEC stack and typically on the order of seconds; and $\tau_t$: The thermal time constant associated with the thermal mass of the SOEC stack and the temperature response to heat flow, typically on the order of minutes.

Two dynamic time constants of relevance may also be considered as:

$\Sigma_{pwm}$: A controlled time constant associated with the pulse width modulated current modulating strategy described above.

$\tau_{flow}$: A controlled time constant associated with the overall system's ability to ramp flow rates, for example in response to a requested step change in operating power.

As long as the operating frequency is slow enough that the operation is dominated by the on and off times (and not the transition times), the stack will be nominally thermally neutral. As used herein, the term "dominant thermal condition" refers to the thermal condition of the cell for greater than 90 percent of the duration of an operational cycle. Thus, when the dominant thermal condition of an electrolysis cell stack is thermally neutral, the stack is operating in a thermally neutral condition for greater than 90% of the duration of an operational cycle. In particular, as long as the operating frequency is fast enough that inlet gas does not travel all the way through the SOEC stack and past the cell active area without reacting, the effective utilization will be set by the nominal flow rate. These constrain both the highest and lowest operating frequency. Given the several order of magnitude difference in the time constants of these two processes, there is much leeway to find operable frequencies that satisfy both requirements. Both processes are significantly faster than thermal heating and so do not impose any significant thermal transients on the stacks or system.

Figure 5:
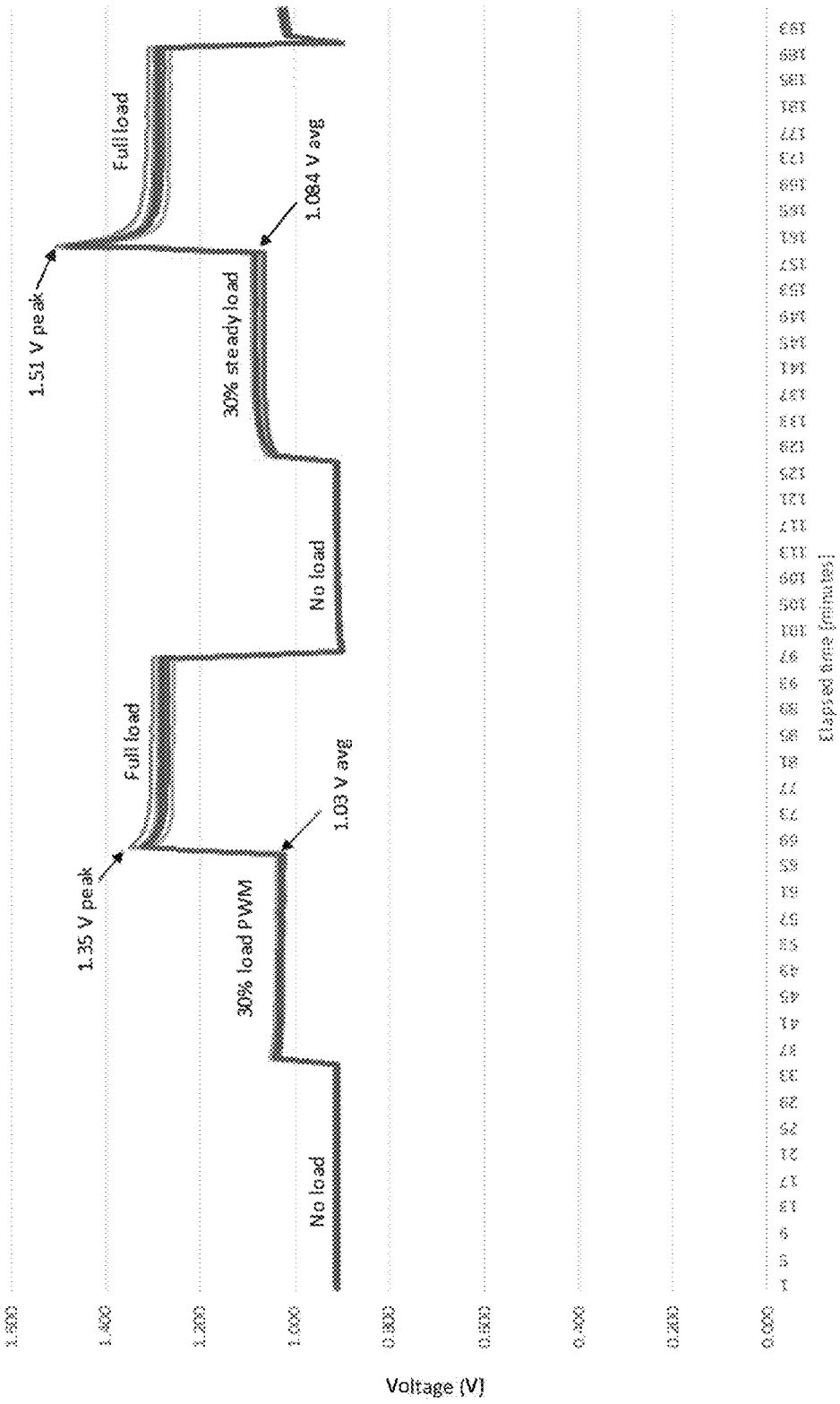
FIG. 5 shows experimental test results for a subscale solid oxide electrolysis stack operating in a furnace, according to an exemplary embodiment.

For example, FIG. 5 illustrates experimental test results for a subscale solid oxide electrolysis stack operating in a furnace, according to an exemplary embodiment. This is an ideal environment for fast transient response, where furnace heat supports endothermic stack operation. FIG. 5 shows identical operating conditions operated first in pulse width modulated mode (the subject of this disclosure) and then repeated in a typical steady loading strategy. The operating conditions for each case start at no load, make a step change to 30% load and dwell for 30 minutes, then a step change to full load and dwell for 30 minutes, followed by an unload.

Noting that lower voltage reflects higher efficiency, it should first be observed that at 30% load, the pulse width modulated test is operating at higher efficiency. This is because it is maintaining operating temperature and can therefore operate with peak efficiency. In contrast, the steady state operation at 30% load is operating about 5% less efficiently because the stack is being cooled by virtue of operating endothermically. This is only possible because this test is running in a furnace that is acting to maintain the temperature around the endothermic stack. In an actual system it would be harder to maintain the operating temperature of an endothermic stack, and the resultant cooling and drop in efficiency would likely be larger.

Still referring to FIG. 5, it should secondly be noted that on the step change to full load there is a slight voltage recovery in the pulse width modulated case, but a much larger recovery in the conventional case. This reflects the lower operating temperature reached during part load operation, and the associated inefficiency when stepped to full load. In an actual production system, not only would the part load temperature likely be lower, but the available driving voltage might not be high enough to drive the cold stack to peak current, and as a result the endothermic operation would continue potentially greatly increasing the transition time.

Figure 6:
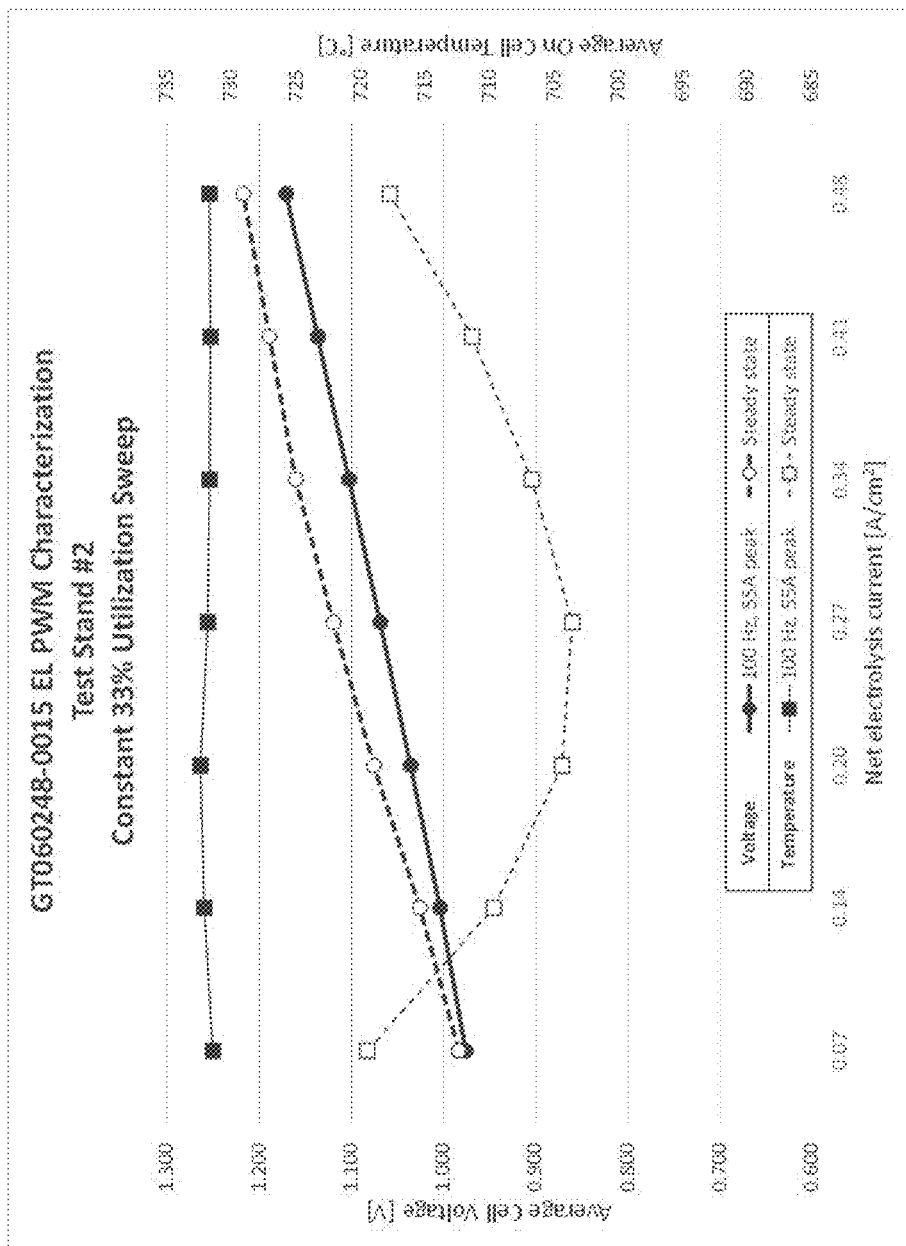
FIG. 6 compares experimental voltage and temperature response results of a sub-scale solid oxide electrolysis stack stepped progressively through part load conditions from 10% to 70% load, according to an exemplary embodiment.

FIG. 6 compares experimental voltage and temperature response results of a sub-scale solid oxide electrolysis stack stepped progressively through part load conditions from 10% to 70% load, according to an exemplary embodiment. The filled data points are the average in-stack temperature (squares) and average cell voltage (circles) when operated in pulse width modulated mode, in the empty data points are the same results when operated in a conventional, steady-state mode.

Of note is that in pulse width modulated mode, the stack temperature is constant regardless of setpoint, whereas in conventional operation the stack progressively cools with a minimum temperature occurring at around 40% load. This sub-scale test occurs within an electric furnace with a constant temperature setpoint, in a real system the stack temperature would be expected to drop more significantly. Also of note is the higher efficiency of the stack at every part power operating point, and the near perfect linear response. Higher efficiency is beneficial for obvious reasons, for example, a reduction in the energy cost per volume of electrolyzed gas. Linearity is beneficial for the resultant improvement in predictability and controllability of the overall system.

Moreover, by avoiding endothermic operation, the stack (and system) are better able to respond to transients, and therefore have better ability to load follow, as compared to conventional operation. However, the additional benefits of easier temperature and electrical control also improve the system when the stacks are controlled with a pulse width modulated control strategy. Furthermore, it is known that thermal transients are an aging mechanism for solid oxide electrolysis stacks, and by operating with pulse width modulated control, most of the thermal transients that would otherwise be induced can be avoided.

By enabling operation at part load, while retaining thermal neutrality at the stack, the system need not be designed to support heavily endothermic operation or large variations in operating temperature. This offers significant simplifications to the system design. In addition, by keeping the SOEC stack near thermally neutral, even at part load conditions, the system can be much more responsive to changes in electrical power.

Figure 2:
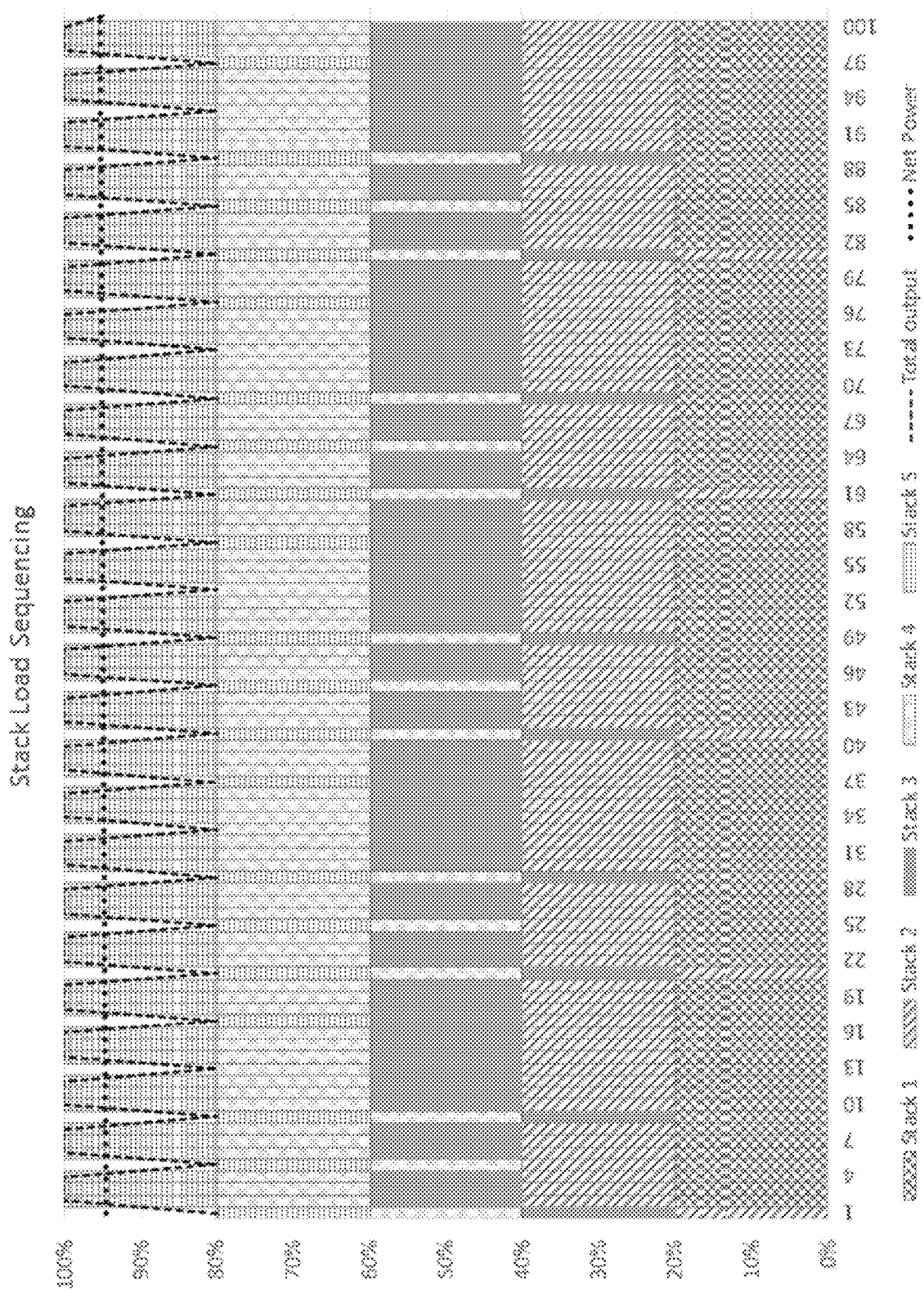
FIG. 2 shows examples of independent ON/OFF switching of SOEC stacks for a SOEC system operating at 95% net power.
Figure 3:
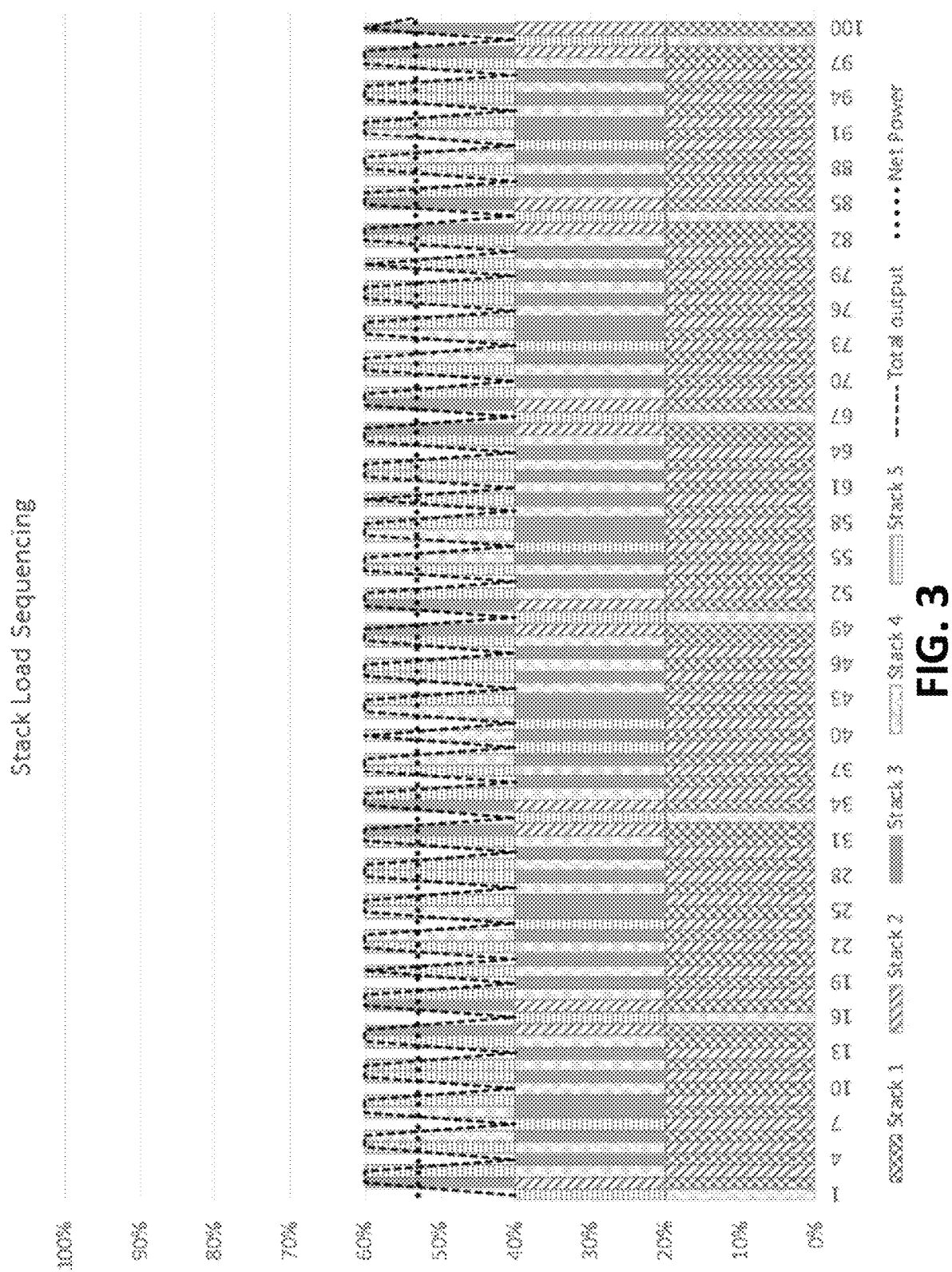
FIG. 3 shows examples of independent ON/OFF switching of SOEC stacks for a SOEC system operating at 53% net power.
Figure 4:
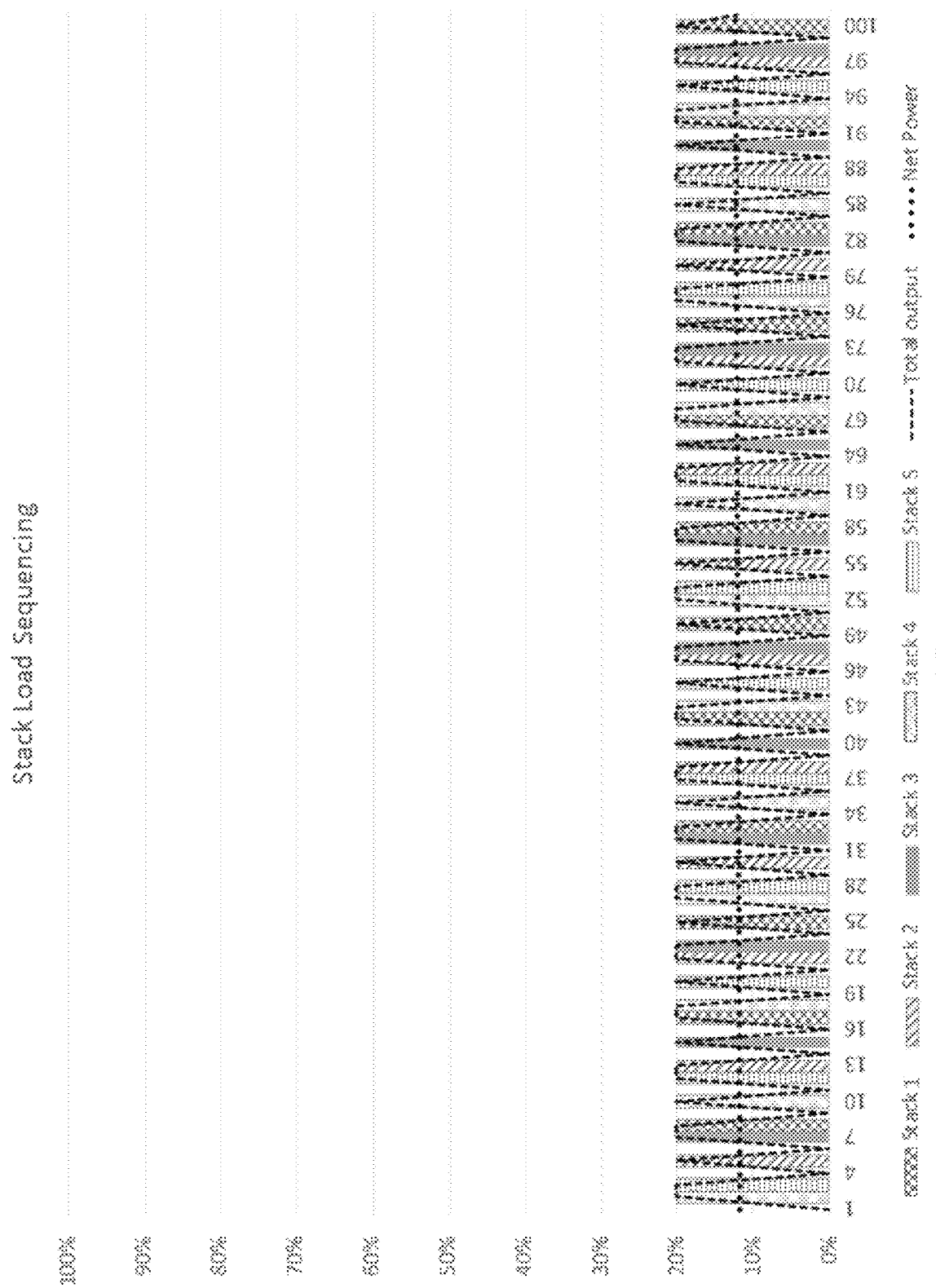
FIG. 4 shows examples of independent ON/OFF switching of SOEC stacks for a SOEC system operating at 12% net power.

Referring to FIGS. 2-4, the operational method will be described in further detail for a relatively small SOEC system including five branches electrically connected in parallel. Each of the branches includes one SOEC stack, and is identified as Stack 1, Stack 2, Stack 3, Stack 4, or Stack 5. However, it is understood that each branch may include any number of SOEC stacks, for example, each branch may include 20 to 40 SOEC stacks. Switching examples in the operational method are shown for 95% net power (FIG. 2), 53% net power (FIG. 3), and 12% net power (FIG. 4). The net power percentages represent the average operating power divided by the rated power of the system (i.e., the operating power at the thermally neutral voltage). The operational cycle is shown for the first 100 cycles, where each number on the x-axis identifies a cycle number. Each shading in the bar chart represents a specific SOEC stack operating at full current (Mode 1). Thus, in cycle numbers in which the shading for a particular SOEC stack is not shown, it is understood that the particular SOEC stack is unloaded (Mode 2). The dashed line shows the total instantaneous power, while the dotted line shows the time averaged power. With five SOEC stacks, the maximum instantaneous power step is set to 20% of rated power (calculated by dividing 100% by a number of the SOEC stacks in the SOEC system), and this sets the requirements for any electrical system (e.g., a capacitor bank) that may be required. As the number of stacks increases the amount of smoothing required decreases.

Referring to FIG. 2, in the first cycle at 95% net power, the first SOEC stack is off (the shading for Stack 1 is not present) and the other four SOEC stacks are operating at 100% power (the shadings for Stacks 2-5 are present) such that the total power is below 95% of rated power. In the second cycle, all of the SOEC stacks are operating at 100% power (the shadings for Stacks 1-5 are present) such that the total power exceeds 95% of rated power, this condition persists through the fourth cycle. In the fifth cycle, the third SOEC stack is off (the shading for Stack 3 is not present), and the other four SOEC stacks are operating at 100% power (the shadings for Stacks 1, 2, 4 and 5 are present) such that the total power is again below 95% of rated power. As seen in FIG. 2, each SOEC stack can be loaded independent of the other SOEC stacks from open circuit to full load, while operating at a thermally neutral or near thermally neutral condition and maintaining 95% net power. In some aspects, the total power cycle is a first predetermined percentage of rated power, each of the solid oxide electrolysis cell stacks operate in the ON phase for a predetermined percentage of time, and the first predetermined percentage of rated power is equal to the predetermined percentage of time during which each of the solid oxide electrolysis cell stacks operate at 100% power. In FIG. 2, each of the five stacks is on 95% of the time (i.e., the predetermined percentage of time) in this cycle, the total cycle power is likewise 95% of rated power (i.e., the first predetermined percentage of rated power).

As shown in FIG. 2 each individual stack (or electrical branch) have an ON-time equal to the desired output power level (when expressed as a percentage of rated power) when averaged over the full operational cycle. As shown in FIG. 2 the timing for each stack (or electrical branch) is offset relative to each other branch such that the sum total of stacks in their ON-cycle never varies by more than one stack (or electrical branch) at a time. For example there is no time step where less than four stacks are on simultaneously even though each of the stacks if off exactly five times in the course of the 100 step cycle illustrated.

In some examples, at least one of the SOEC stacks is unloaded at regular, repeating intervals in an operational cycle of the solid oxide electrolysis cell system (e.g., a regular pattern of ON for 5 ON phases, OFF for 1 OFF phase, ON for 5 ON phases, OFF for 1 OFF phase, etc.). In some examples, at least one of the solid oxide electrolysis cell stacks is unloaded at irregular, non-repeating intervals in an operational cycle of the solid oxide electrolysis cell system (e.g., an irregular pattern of ON for 5 ON phases, OFF for 2 OFF phase, ON for 3 ON phases, OFF for 4 OFF phase, etc.).

Referring to FIG. 3, switching examples in the operational method are shown for maintaining 53% net output power. In the first cycle, the fourth and fifth SOEC stacks are 100% on (the shadings for Stacks 4 and 5 are present), while the first to third SOEC stacks are off (the shadings for Stacks 1-3 are not present). The SOEC system is operating at 53% output power, there are no cycles in which all five SOEC stacks are operating. Instead, in any given cycle, two to three of the SOEC stacks are 100% on. Never more than three and never less than two stacks are on at any particular cycle. Each stack (or electrical branch) operates with the same 53% overall duty when evaluated over a sufficiently long period (here illustrated and realized over 100 cycle steps). The target power levels need not be discrete values related to stack count. Any part load condition of the SOEC system is achievable with a suitable cycle, although as the desired resolution increases, so may the overall length of the switching cycle. With 100 steps (as shown in FIG. 3), output power can be modulated to the nearest 1%. In FIG. 3, each SOEC stack is on 53% of the overall cycle. There are relatively few locations where any particular stack is on for two sequential cycles reflecting that 53% is only slightly above 50% where every stack would be ON exactly 50% of the time.

Referring to FIG. 4, switching examples in the operational method are shown for maintaining 12% output power. Each SOEC stack is on approximately once every 8 cycles. The SOEC stacks are each switching between open circuit ("off"), which is inherently thermally neutral, and full power ("on"), which is configured to be thermally neutral such that the operating point does not result in SOEC stack cooling other than waste heat loss from the process. This waste heat loss can be balanced by selecting an on phase that is slightly exothermic, assuming the heat loss is small, which it should be in general for an efficient electrolysis system.

One constraint on turndown is the minimum switching frequency linked to the period of time it takes for a molecule of reactant to flow from inlet to outlet of the electrochemically active area. In the example of FIG. 4, with off periods as long as 8 cycles, the switching frequency must be selected such that 8 cycles does not result in excessive reactant bypass flow through an unpowered SOEC stack. This may not be that much of a constraint because presumably, the system flow rates have been adjusted for the lower power condition (12% net power). If the flow rates are 8 times lower, then the flow period is also 8 times longer, and thus, no change to switching frequency is required. If the flow rates are not 8 times lower, then the switching period does not affect overall utilization since even in the on period, there will be excess reactant flow.

In none of the examples of FIGS. 2 to 4 or for any other net power maintained according to the operational method is it required that the reactant flow be interrupted or redirected to select SOEC stacks. The reactant flows are evenly distributed to all SOEC stacks, and as long as the switching frequency is selected appropriately, there is no impact on SOEC stack or system utilization.

In the examples illustrated two underlying assumptions are illustrated. 1) At any particular cycle the power is distributed to those stacks (electrical branches) from which power has not been demanded for the longest time. This ensures a rolling power demand that minimizes the sequential ON-time and OFF-times for any particular stack. 2) Each stack (or electrical branch) supplies power in exact proportion with the system level power demand. Neither assumption is necessary to the overall control strategy. For example a random or semi-random determination of which stacks to turn on for a particular cycle could be used. The individual power branches need not be operated in exact proportion to the overall system demand but instead could be operated in response to both system demand and individual branch capacity (or health) such that weaker branches could be loaded less than stronger branches, or particular branches could be preferentially heated (or cooled) in preparation for or in response to slower power transitions.

Referring to FIG. 1, the operational method described above allows the SOEC stack to always operate at point d or point e from a thermal and power perspective. Both points d and e are thermally neutral. At 50% power, the SOEC stack spends half its time at point d and half its time at point e. The SOEC stack is maintained at full operating temperature, and can be ramped to full power as fast as the reactants can be available, all without appreciable swing in operating voltage or operating temperature.

Furthermore, consider the range of 20% to 30% of rated power. In this region, even allowing the SOEC stack to cool to 650° C. is not sufficient to move the SOEC stack out of a heavily endothermic condition. Process heaters or very low stack temperatures, which present control challenges and severe limitations in dynamic response capability, would be required. As a result, a further benefit of the operational method is an extended turndown capability compared to conventional control strategies.

By avoiding the heavily endothermic part load conditions, the balance of system can be simplified as it need not support heavily endothermic or heavily exothermic conditions. Instead, the SOEC system and the SOEC stack operate near thermally neutral, or with a particular design offset towards endothermic or exothermic operation as desired. Likewise the SOEC system can compensate for stack degradation with time, while maintaining a tight operating window at conditions most favorable to stack life and performance. In addition, the SOEC system can operate at part load conditions, while holding the SOEC stack at conditions conducive to near-instantaneous loading to full load, allowing for much faster transient response than would otherwise be the case.

According to the operational method, the SOEC stacks will be maintained at operating temperature even when operating at part load conditions. This means that the power draw from the SOEC stacks can be increased to full power at the sub-second scale for short term transients, and at the second scale for longer term transients requiring flow changes. This greatly increases the potential for grid voltage and frequency stabilization as the available modulation is much larger than a conventionally controlled SOEC system.

The operational method described above allows for sustained operation of the SOEC system at part load (i.e., not full load) conditions. The operational method does not rely on supplemental heating. Instead, the operational method relies on the self-heating of the SOEC stacks. This allows separation of the heat-up requirements, which may simplify the balance of plant in the SOEC system, where the balance of plant is the auxiliary equipment required to ensure the SOEC system operates as a reliable power source. According to the operational method, heat is produced at the location in which it is needed (within the SOEC stack), eliminating the need to optimize for heat transfer from separate heaters into the SOEC stack, offering simplifications to an overall hot module. Thus, the operational method also reduces the thermal loads on the SOEC stack for potential increases in stack efficiency and longevity.

As illustrated in FIG. 1, the performance/temperature curve is not symmetric. If the SOEC stack is allowed to cool in a part load operational strategy, then the SOEC stack is limited in its ability to ramp power upwards. For example, when operating at 50% power, the SOEC stack may only be able to increase to 60% power quickly, and may take minutes to ramp to 100% power, while maintaining reasonable temperatures within the SOEC stack. In contrast, the operational method described above allows for fast ramping from any power level to any other power level, as fast as the process gasses can be ramped.

The operational method may be particularly suited to highly modular arrays of stacks, where the impact of electrical switching on the power bus can be moderated by sequencing stacks out of phase. For example, at 50% load conditions, half the stacks will be on at any particular time, and at no time will no stacks be active. For a single stack, the current switching may impose noise on a resulting DC bus, which can have negative consequences for the efficiency of the system power electronics. In a highly modular system (i.e., one where many stacks share the same DC bus), the transition times of each stack can be offset relative to the other stacks such that the bus noise is minimized. The more stacks operating electrically in parallel, the less the operational method impacts bus voltage and noise. In some aspects, the switching is systematic. In particular, at any given part load condition, the sequence and timing of the SOEC stacks that are on or off is the same. In other aspects, the switching is pseudo-random. In particular, at a given part load condition, the sequence and timing of the SOEC stacks that are on or off is not the same. For example, if one SOEC stack is weaker than another SOEC stack, the pseudo-random approach may smooth the resulting electrical noise. The pseudo-random approach may provide benefits in terms of imposed noise and elimination of unplanned bias within the system.

In some aspects, a pulse width modulated application of power may be used to control the net thermal operating condition of the SOEC stack in a manner independent from the net electrical condition. This idea has been described herein in terms of maintaining net thermally neutral conditions at part electrical load conditions that would otherwise be endothermic. This idea can equally be applied to target specific thermal conditions, for example, for applying net exothermic conditions as a method to help heat the stack. At part load conditions, the pulse width modulated application of power allows for independent control of stack thermal conditions, and as a result, may be used to move the stack temperature up or down in response to other system demands.

In some aspects, the operating frequency of the SOEC stack can vary between a low bound dictated by the geometry of the stack and the net flow period for any fluid particle to traverse from the cell active area inlet to the cell active area outlet, and a high bound dictated by the point of diminishing efficiency returns due to switching losses, and ultimately by the point at which cell electrical performance starts to become equivalent to a part load condition, at which point the thermal benefits start to disappear.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

The operations described above may be executed by a computer programmed to perform the steps of the algorithm. Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus or processing circuit on data stored on one or more computer-readable storage devices or received from other sources.

The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

What is claimed is:

1. A method of operating a solid oxide electrolysis cell system at partial load, the solid oxide electrolysis cell system including a plurality of branches electrically connected in parallel, each branch including at least one solid oxide electrolysis cell stack, each solid oxide electrolysis cell stack including a plurality of solid oxide electrolysis cells, the method comprising:

determining, for a given operating temperature, a thermally neutral target voltage below which operation of the solid oxide electrolysis cell system is endothermic and above which operation of the solid oxide electrolysis cell system is exothermic; and executing pulse width modulation current control by cycling an ON phase and an OFF phase for each of the branches such that, for an operational cycle of the solid oxide electrolysis cell system, the solid oxide electrolysis cell system operates at an average operating power equal to a chosen percentage of the operating power at the thermally neutral target voltage, wherein:

in the ON phase, all of the solid oxide electrolysis cell stacks in a given branch operate at the thermally neutral target voltage, and in the OFF phase, all of the solid oxide electrolysis cell stacks in the given branch are unloaded to an open circuit voltage and operate at 0% of rated power while a flow of steam to the stacks in the given branch continues without interruption;

each of the branches is configured to be operated in the ON phase or in the OFF phase independent of the other branches; and in the operational cycle, each branch enters a first OFF phase before any branch enters a second OFF phase.

2. The method of claim 1, wherein in at least one period of time in the operational cycle, all of the branches are in the OFF phase.

3. The method of claim 1, wherein in at least one period of time in the operational cycle, all of the branches are in the ON phase.

4. The method of claim 1, wherein in at least one period of time in the operational cycle, at least one branch is in the ON phase while at least one other branch is in the OFF phase.

5. The method of claim 4, wherein switching between the ON phase and the OFF phase occurs between successive periods of time in the operational cycle, as opposed to during a period of time.

6. The method of claim 1, wherein in the operational cycle:

a first branch is in the ON phase for the duration of a first period of time, while a second branch is in the OFF phase for the duration of the first period of time;

the second branch is switched to the ON phase at a beginning of a second period of time and remains in the ON phase for a duration of the second period of time; and the first branch remains in the ON phase for the duration of the second period of time, or is switched to the OFF phase at the beginning of the second period of time and remains in the OFF phase for the duration of the second period of time.

7. The method of claim 1, wherein each branch includes a plurality of solid oxide electrolysis cell stacks.

8. The method of claim 1, wherein executing pulse width modulation current control comprises:

selecting a pulse width modulated frequency and a duty cycle such that a dominant thermal condition is thermally neutral such that transition periods between ON and OFF phases or OFF and ON phases account for less than 10 percent of the duration of the operational cycle.

9. The method of claim 8, wherein the pulse width modulated frequency and the duty cycle are selected such that each branch switches from the ON phase to the OFF phase before cell starvation due to reactant depletion occurs.

10. The method of claim 8, wherein the pulse width modulated frequency and the duty cycle are selected such that the dominant thermal condition is thermally neutral or selected by a controller programmed to target slightly net endothermic or slightly net exothermic conditions such that temperatures of the solid oxide electrolysis cell stacks are constant or are ramped in a controlled manner between target operating temperatures reflecting system demand.

11. The method of claim 10, wherein an operating current density of each branch is within 50 mW/cm2 of a current density at the thermally neutral target voltage during the ON phase.

12. The method of claim 1, wherein:
a total power cycle is a first predetermined percentage of rated power;
each of the branches operate in the ON phase for a predetermined percentage of time; and
the first predetermined percentage of rated power is equal to the predetermined percentage of time during which each of the branches operate in the ON phase.

13. The method of claim 1, wherein a maximum instantaneous power step when a branch is cycled from the OFF phase to the ON phase is a second predetermined percentage of rated power, the second predetermined percentage of rated power being calculated by dividing 100% by the number of branches in the solid oxide electrolysis cell system.

14. The method of claim 13, wherein a magnitude of electrical smoothing is determined based on the maximum instantaneous power step.

15. The method of claim 1, wherein at least one of the branches operates at 100% of rated power in a first ON phase, and operates at 0% of rated power in a next OFF phase that immediately follows the first ON phase.

16. The method of claim 1, wherein at least one of the branches is unloaded and operated at 0% of rated power at regular intervals in the operational cycle of the solid oxide electrolysis cell system.

17. The method of claim 1, wherein at least one of the branches is unloaded at irregular intervals in the operational cycle of the solid oxide electrolysis cell system.

18. A solid oxide electrolysis cell system comprising:
a plurality of branches electrically connected in parallel, each branch including at least one solid oxide electrolysis cell stack, each solid oxide electrolysis cell stack including a plurality of solid oxide electrolysis cells; and
a controller programmed to:
determine a thermally neutral target voltage below which operation of the solid oxide electrolysis cell system is endothermic and above which operation of the solid oxide electrolysis cell system is exothermic; and
execute pulse width modulation current control by cycling an ON phase and an OFF phase for each of the branches such that the solid oxide electrolysis cell system operates at the thermally neutral target voltage for an operational cycle of the solid oxide electrolysis cell system, wherein:
in the ON phase, a branch operates at the thermally neutral target voltage,
in the OFF phase, a branch is unloaded to an open circuit voltage and operates at 0% of rated power while a flow of steam to the stacks in the branch continues without interruption,
each of the branches is configured to be operated in the ON phase or the OFF phase independent of the other branches; and
in the operational cycle, each branch enters a first OFF phase before any branch enters a second OFF phase.

19. The solid oxide electrolysis cell system of claim 18, wherein each of the plurality of solid oxide electrolysis cells comprises an anode, a cathode, and a solid ceramic electrolyte between the anode and the cathode.

20. The solid oxide electrolysis cell system of claim 19, wherein the solid ceramic electrolyte comprises nonporous metal oxide.

* * * * *